(12) United States Patent
Lahtiranta et al.

(10) Patent No.: US 8,719,378 B2
(45) Date of Patent: May 6, 2014

(54) SYSTEM AND METHOD FOR STORING AND PROVIDING CONTENT TO CLIENT DEVICES

(75) Inventors: Atte Tapio Lahtiranta, Espoo (FI); Jyrki Berg, Lohja (FI)

(73) Assignee: Vringo Infrastructure Inc., New York, NY (US)

( * ) Notice: Subject to any disclaimer, the term of this patent is extended or adjusted under 35 U.S.C. 154(b) by 3549 days.

(21) Appl. No.: 10/868,499

(22) Filed: Jun. 14, 2004

(65) Prior Publication Data

US 2006/0015520 A1    Jan. 19, 2006

(51) Int. Cl.
*G06F 15/16*    (2006.01)

(52) U.S. Cl.
USPC .............. 709/219; 725/22; 725/36; 725/32; 725/104

(58) Field of Classification Search
USPC ........ 709/219, 217, 218, 205; 725/46, 51, 22, 725/36, 32, 104; 705/50; 345/810
See application file for complete search history.

(56) References Cited

U.S. PATENT DOCUMENTS

| 2001/0001160 A1* | 5/2001 | Shoff et al. ................ 725/51 |
| 2002/0180803 A1* | 12/2002 | Kaplan et al. ............. 345/810 |
| 2004/0054627 A1* | 3/2004 | Rutledge ..................... 705/50 |
| 2004/0078812 A1* | 4/2004 | Calvert ........................ 725/46 |
| 2004/0153509 A1* | 8/2004 | Alcorn et al. ............... 709/205 |
| 2006/0212531 A1* | 9/2006 | Kikkawa et al. ........... 709/217 |

FOREIGN PATENT DOCUMENTS

| WO | WO 2004/025421 | 3/2004 |
| WO | WO 2004/025421 A2 | 3/2004 |
| WO | WO 2004/036460 | 4/2004 |
| WO | WO 2004/036460 A2 | 4/2004 |
| WO | WO 2004/049220 | 6/2004 |
| WO | WO 2004/049220 A2 | 6/2004 |

OTHER PUBLICATIONS

Brew Distribution System (BDS) Overview, Qualcomm Incorporated, 2003, pp. 1-17.
Korean Office Action for corresponding KR Application No. 10-2007-7000745, Aug. 11, 2009, Korea.
Chinese Office Action for corresponding CN Application No. 200580026950.0, Jan. 8, 2010, China.

* cited by examiner

*Primary Examiner* — Le H Luu
(74) *Attorney, Agent, or Firm* — Cozen O'Connor

(57) ABSTRACT

A system and method for content management and delivery. Embodiments of the invention may include receiving a plurality of content items from a plurality of content providers, organizing the plurality of content items in a hierarchy, receiving a request for at least one content item among the plurality of content items; and providing the at least one content item subsequent to receiving the request. The content items may be organized on a server. An end user on a client device that communicates, directly or indirectly, with the server, such as a mobile device, for example, may browse the content, preview it, and purchase it, all in a consistent manner from content item to content item.

2 Claims, 5 Drawing Sheets

SYSTEM AND METHOD FOR STORING AND PROVIDING CONTENT TO CLIENT DEVICES

FIELD OF THE INVENTION

The present invention relates to the field of content management and, in particular, to organizing and distributing content from a server to a client device, where the client device is a mobile device, for example, and, also in particular, to providing a mechanism by which an end user at the client device may find, preview and purchase content.

BACKGROUND

The amount of content and the number of applications available for mobile device users continues to increase rapidly. In addition to the graphics and ring tones that have been available to mobile device users for some time now, content developers are increasingly making available to mobile device users games, music, videos, applications and the like.

However, for many mobile device users, finding and purchasing content for their mobile device has been cumbersome and inconvenient for a variety of reasons. Along with the increase of available content has come an increase in various content formats, delivery options and payment methods. For example, while many mobile devices can currently access the Internet when searching for content, each content developer has its own web site, thereby forcing end users to access different sites for each separate content item or application desired, typically a very time consuming process. Moreover, each content developer may generate content in a proprietary format or in a format incompatible with other content formats, leaving the end user with any number of content items that may be incompatible with one another or, worse, incompatible with the end user's mobile device. In addition, payment methods can differ from content developer to content developer, forcing end users to pay for content in different ways and to maintain payment ability in a variety of different formats.

Accordingly, the methods by which a mobile device user finds content, has that content delivered and pays for the content has become increasingly complex and frustrating. Mobile device users have needed a single system that integrates for end users the process of finding content, paying for content, and having that content delivered to their mobile device.

SUMMARY OF THE INVENTION

According to an embodiment of the present invention, a method for storing and providing content on a server may include receiving a plurality of content items from a plurality of content providers; organizing the plurality of content items in a hierarchy; receiving a request for at least one content item among the plurality of content items; and providing the at least one content item subsequent to receiving the request. The plurality of content items may include a plurality of formats.

According to an embodiment of the present invention, organizing the plurality of content items may include establishing a plurality of catalogs. Each catalog among the plurality of catalogs may include at least one category. The at least one category may include the least one content item. The content may be organized on a server.

According to an embodiment of the present invention, receiving a request may include receiving a request that originates from a mobile device. The mobile device may be a cellular telephone. Receiving a request may also include receiving a request that is delivered by an operator server. The operator server may provide service to the mobile device.

According to an embodiment of the present invention, a system for storing and providing content may include a storage device for storing a plurality of content items from a plurality of content providers; a processor for organizing the plurality of content items in a hierarchy on the storage device; and a communication device for receiving a request for at least one content item among the plurality of content items and for providing the at least one content item subsequent to receiving the request. The processor may be configured to partition the storage device into a plurality of catalogs. The processor may also be configured to partition each catalog among the plurality of catalogs into at least one category. The processor may also be configured to partition the at least one category into the at least one content item.

According to an embodiment of the present invention, the system may further include a client device for requesting and receiving the at least one content item. The client device may originate a request sent to the communication device. The client device may be a mobile device. The mobile device may be a cellular telephone.

The client device may be configured to view the hierarchy of the plurality of content items. Also, the client device may be configured to allow a selection of the at least one content item in the hierarchy of the plurality of content items. The client device may also be configured to send the selection of the at least one content item. The selection of the at least one content item may be received by the communication device.

According to an embodiment of the present invention, a method for selecting and receiving a content item may include presenting a hierarchy of a plurality of content items from a plurality of content providers; facilitating a selection of a content item in the hierarchy of the plurality of content items; sending a request for a selected content item; and receiving the selected content item. Facilitating a selection may include presenting a preview of a selected content item. Facilitating a selection may further include facilitating a purchase of the selected content item.

BRIEF DESCRIPTION OF THE DRAWINGS

A detailed description of embodiments of the invention will be made with reference to the accompanying drawings, wherein like numerals designate corresponding parts in the several figures.

DETAILED DESCRIPTION OF EXEMPLARY EMBODIMENTS

In the following description of preferred embodiments, reference is made to the accompanying drawings which form a part hereof, and in which is shown by way of illustration specific embodiments in which the invention may be practiced. It is to be understood that other embodiments may be utilized and structural changes may be made without departing from the scope of the preferred embodiments of the present invention.

Embodiments of the present invention relate to the organization of content on a server and the transfer of content between a server and a client device. Embodiments of the present invention also relate to providing a system by which client device end users may find, preview and purchase content. Although embodiments of the present invention are described below in the context of a server and a mobile client device, embodiments of the present invention may be used in a variety of ways and in a variety of environments. For example, according to embodiments of the present invention, content may be delivered by a service operator, retailer or distributor to a mobile device. The mobile device may be a cell phone, a personal digital assistant and the like. The content delivered to the mobile device may be any of a variety of content types such as, for example, applications, graphics, videos, music and the like. Embodiments of the present invention may be used in any environment in which content is made available from a server to a device user.

Figure 1:
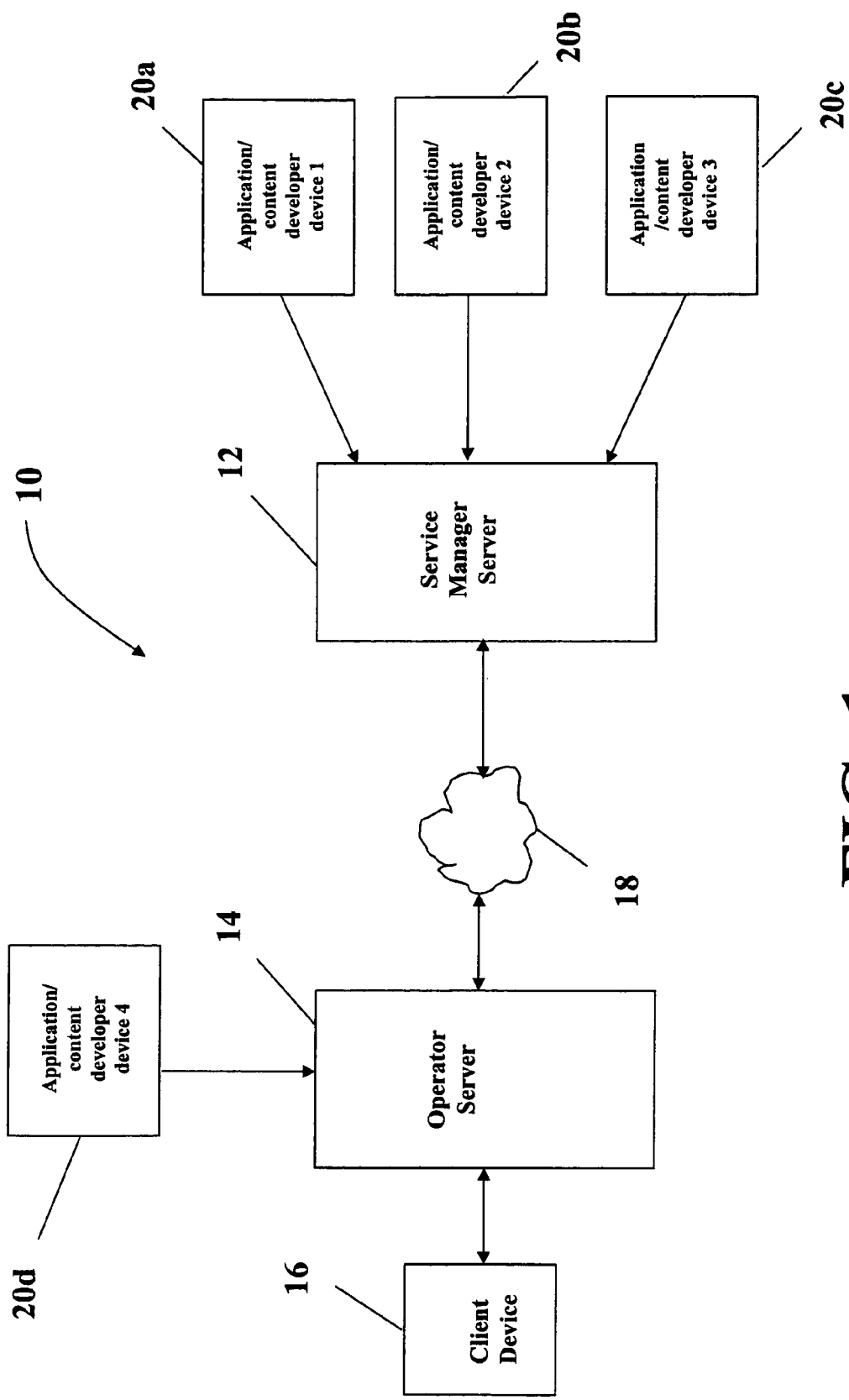
FIG. 1 is a generalized block diagram of the system environment that provides the management and delivery of content according to an embodiment of the present invention.

FIG. 1 is a general block diagram of a content management and delivery system 10 according to an embodiment of the present invention. The system 10 of FIG. 1 may include, without limitation, a service manager server 12, an operator server 14 and a client device 16. The service manager server 12 and the operator server 14 may be connected via a network 18. One or more application/content developer devices, 20a, 20b and 20c may interface with the service manager server 12. Likewise, one or more application/content developer devices 20d may interface with the operator server 14. The client device 16 may interface with the operator server 14. According to an embodiment of the present invention, the interface between the client device 16 and the operator server 14 may be direct or indirect and may be through a wireless connection.

The service manager server 12 may be a single server or may be multiple servers. In addition, the service manager server 12 may be configured as a server computer that is common in the art and may include, without limitation, memory, one or more processors, input, output and the like. Similarly, the operator server 14 may be configured as a server computer common in the art and may also include, without limitation, memory, one or more processors, input, output and the like. The client device may be any of a variety of mobile devices that are common in the art. For example, the client device may be a cellular telephone, a personal digital assistant and the like. The network 18 may be the internet, a wide area network, a local area network and the like.

In the embodiment of the invention shown in FIG. 1, content is made available by content developers via the application/content developer devices 20a, 20b and 20c to the service manager server 12. For purposes of the description of embodiments of the present invention herein, the term "content" will be used to apply to any type of content or application that may be stored on a server and downloaded to a client. For example, content may include MIDI files, WAV files, MP3 files, JPEG images, PNG images, applications native to the client device, Mobile Information Device Profile (MIDP) applications, and the like. Content may be developed or created by developers and delivered in any of a variety of formats to the service manager 12. For example, content may be sent via a network from a developer device 20a, 20b and 20c to the service manager server 12.

According to another embodiment of the present invention, content created by a developer may be delivered to the service manager server 12 via a fixed medium such as, for example, a CD or a DVD. The content may then be loaded onto the service manager server 12 via an appropriate hardware mechanism such as, for example, a CD drive or a DVD drive.

In FIG. 1, if the user of the client device 16 is interested in downloading content to the client device 16, the client device may send a message to the operator server 14 which may, in turn, request content from the service manager server 12. The service manager server 12 may then deliver the content via the network 18 to the operator server 14, which, in turn, can send the content to the client device 16.

Figure 2:
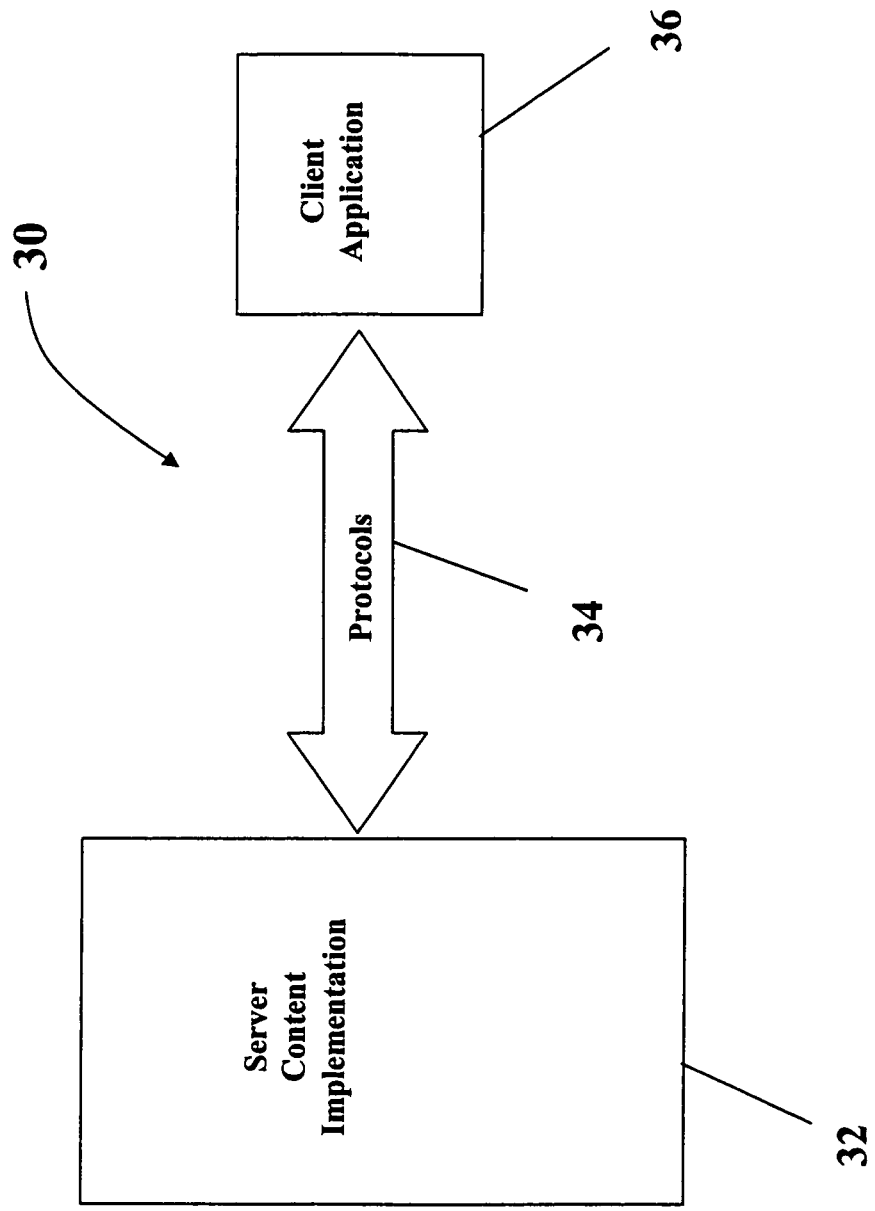
FIG. 2 is a generalized block diagram of a system implementation for the management and delivery of content according to an embodiment of the present invention.

FIG. 2 shows a client-server implementation 30 for content management and delivery according to an embodiment of the present invention. In FIG. 2, content 32 may be implemented on a server while an application 36 may be implemented on a client device. The application 36 on the client device may access the content 32 implemented on the server via protocols 34 that may be sent in between a client device and a server via a network or some other mechanism.

The content 32 may be implemented on the server as one or more content catalogs that comprise content items, as will be explained in greater detail below. The application 36 may be a content purchasing client on a mobile device that allows the user to access the catalogs and the content items for preview and purchase. The client-server mechanism may be based on a variety of protocols and messaging semantics and may be based on a variety of platforms and standards such as, for example, the Open Mobile Alliance (OMA). For example, according to an embodiment of the present invention, the client-server mechanism may be based on the HTTP protocol using XML messaging semantics that describe both the client-server interactions as well as catalog descriptions.

In addition, embodiments of the present invention, may include a download descriptor scheme that supports, for example, Java MIDP Over-The-Air (OTA) and OMA Download. Downloadable objects may be described and separate download OTA mechanisms may be supported. Thus, a client may download Java MIDlets and native applications in addition to rendered content. The download descriptor may be an XML described content item that may include OTA mechanisms or may embed a Java decompiler and OMA download descriptor into an XML message structure.

Moreover, according to an embodiment of the present invention, the application 36 may be implemented such that it is OTA upgradeable and supports dynamic branding, as will be explained in greater detail below. In addition, the application 36 may include a protection mechanism such as an OMA digital rights management system to, among other things, protect purchased content and support mew business models as they become available.

According to an embodiment of the present invention, various plug-ins may be made available to facilitate the management and distribution of content between the server and the client. For example, plug-ins may be made available that facilitate adapting a client device to any type of content distribution system. As another example, plug-ins may be made available that facilitate physically locating catalogs to a variety of server systems and client devices. According to an embodiment of the present invention, plug-ins may be made available that facilitate the physical location of catalogs between a client device and a third party distribution system or between a server system and a third party distribution system.

Figure 3:
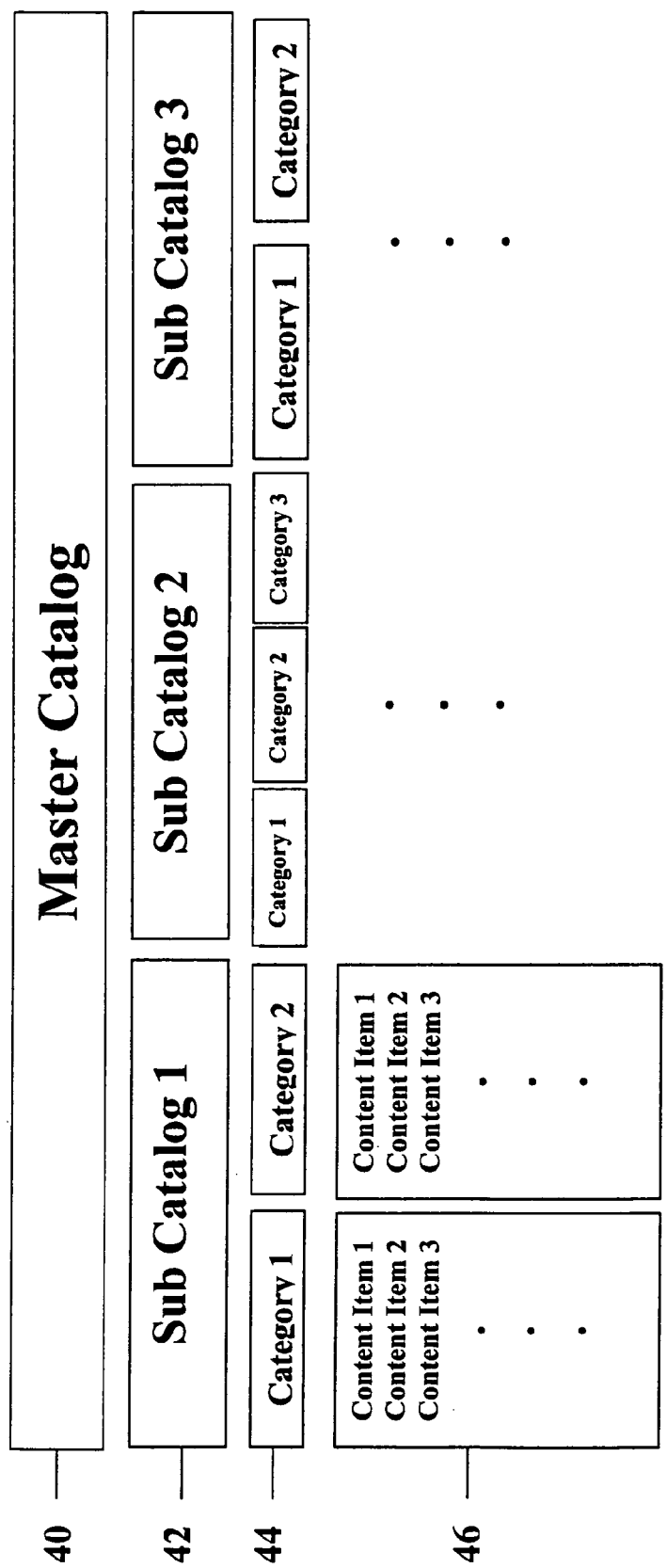
FIG. 3 is a block diagram of content organization according to an embodiment of the present invention.

FIG. 3 shows an example of content organization as it may be implemented on a server device. The server device may include a master catalog 40 at a top hierarchical level of content organization. The master catalog 40 may include a plurality of sub-catalogs 42 that further categorize the content. For example, sub-catalog 1 may include the content of a retailer or service provider and may offer content items that are provided by the retailer. Sub-catalog 2, for example, may include content provided by an independent third party content developer such as, for example, Disney, Warner Brothers and the like. Sub-catalog 3 may include, for example, content provided by an independent third party game developer.

Each of the sub-catalogs 42 may include various categories 44. For example, if sub-catalog 2 is the content catalog for the Disney Company sub-catalog 2 may include one or more categories of Disney-developed content. For example, the first category of content may be animated features, the second category may be children's songs and the like.

Each category may include one or more content items 46. For example, if the first category of a Disney Company catalog is animated films, the first content item may be BAMBI, the second content item may be SNOW WHITE, the third content item may be PINOCCHIO and the like.

It should be noted that the master catalog 40 shown in FIG. 3 may be implemented in any of a variety of ways. For example, each sub-catalog may have further sub-catalogs, each category may have further sub-categories and each content item may have further sub-content items. Thus, the master catalog 40 may have a plurality of hierarchical levels. The master catalog 40 may be organized in any way deemed most advantageous.

In addition, each hierarchical level of the master catalog 40 may have various settings defined for it. For example, each hierarchical level may have settings defined for audiovisual outlook, payment method, access point, a particular plug-in to be used for interfacing with a particular distribution system and the like.

Figure 4:
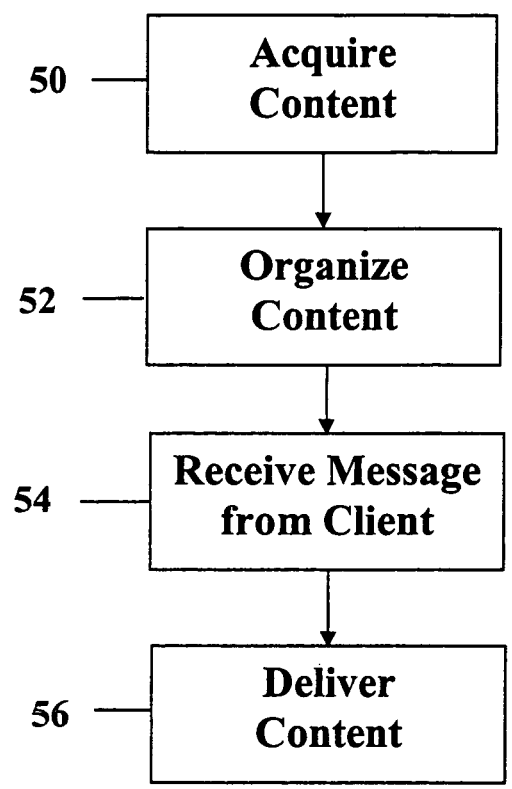
FIG. 4 is a flow diagram for acquiring, organizing and delivering content according to an embodiment of the present invention.

FIG. 4 shows a flow diagram for content management and delivery according to an embodiment of the present invention. At step 50, content is acquired. The content may be acquired by a service manager from content developers. The content developers may work within the service manager organization or may be independent third party content developers. The content acquired may be any type of content and may be acquired in any manner as has been described previously.

At step 52, the content is organized. Once the service manager acquires the content at step 50, the service manager may then organize the content into a master catalog that may sub-catalogs, categories, sub-categories, content items, sub-content items and the like. For example, according to an embodiment of the present invention, the content may be organized on a server in the manner described in connection with FIG. 3.

Once the service manager has organized the content at step 52, the content is available for access by a client application on a client device. Thus, the content is available for, among other things, preview by a user on a mobile device, purchase by the user, and download to the mobile device.

At step 54, a message may be received by the service manager from the client. The message may indicate a variety of things. For example, the message may indicate that a user is looking for a particular type of content and would like to preview that content. According to another embodiment of the present invention, the message may also indicate to the service manager that a user would like to purchase and download content. Once a decision has been made by a user to purchase and download content, the service manager may deliver the content or provide access to it at step 56.

Figure 5:
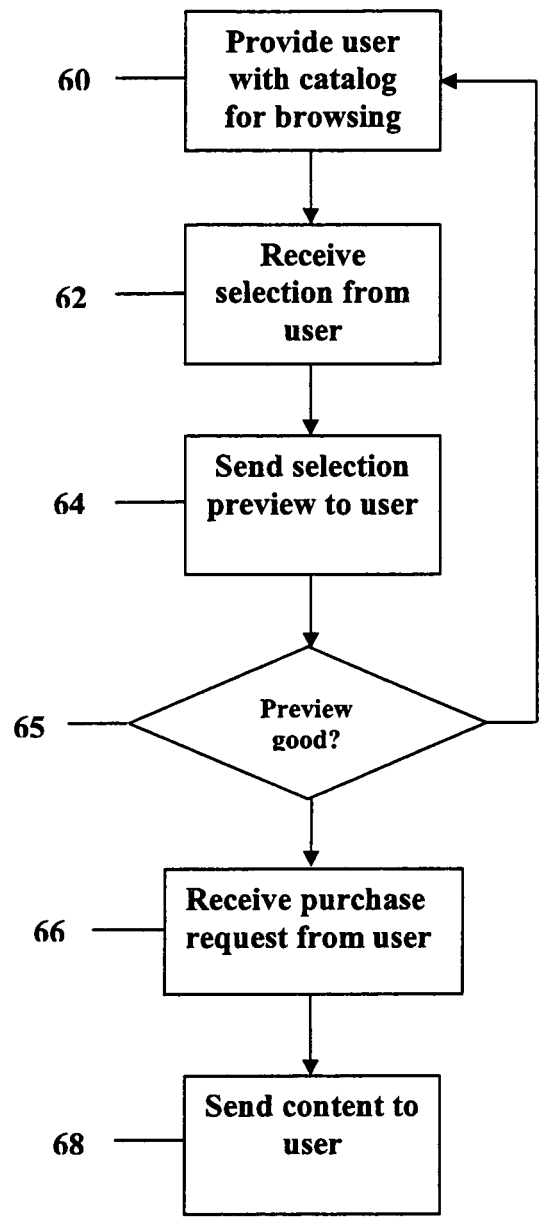
FIG. 5 is a flow diagram for finding, purchasing and receiving content according to an embodiment of the present invention.

FIG. 5 shows a flow diagram for finding, purchasing and receiving content according to an embodiment of the present invention. The client device may be configured so that the user may browse the available content at step 60. For example, according to an embodiment of the present invention, the client may request content catalogs or content item descriptions with XML messages. Responses to the messages may also be XML formulated messages. A response to a request for content may include sending to a client device for display to an end user an easily browseable hierarchy of catalogs and content categories. Once the hierarchy of catalogs and content categories has been sent to a client, it may be available for off-line viewing. In addition, the end user may be notified about updates or additions to content already installed on the client device.

If desired, a service operator or distributor may set its own policy with respect to what an end user is permitted to view or, for example, whether an end user is permitted to see more than one catalog. For example, operators may define what catalogs can be presented to an end user and may define whether an end user can himself add catalog addresses to the client. Allowable end user behavior may be defined by the service operator.

Also, according to an embodiment of the present invention, the client may be fully brandable by the service operator. Thus, each catalog can have its own distinct look, icons, screen background image, colors and the like.

If the end user finds, after browsing through available content, a content item that the end user feels he or she may be interested in, the end user may select that item. The selection is then received by the server from the client at step 62. Next, at step 64, a preview of the selection is sent to the user. The user may then preview the selected content item. According to an embodiment of the present invention, during preview, an end user may see a preview information summary for each item selected and may be permitted to download a more detailed preview information package. Licensing and pricing information may be visible to an end user at all times during preview. For example, if an XML protocol is used, the XML protocol may be expandable and may contain content item descriptions together with payment options and delivery options.

If the user decides, after previewing the selected item, at step 65 that he or she does not like the content item selected, the user may go back to browsing the available content items at step 60. However, if the user finds at step 65 that he or she does like the selected content item after previewing, the user may decide to purchase the selected content item. A purchase request is then received at step 66. The payment method may be defined differently for each catalog, sub-catalog, category, sub-category, content item and the like. The service operator may utilize a variety of different payment methods. For example, according to an embodiment of the present invention, the service operator may utilize a premium price short messaging system (SMS), other premium price billing systems, credit card billing, operator-initiated billing and the like.

At step 68, the purchased content item may be downloaded to the user device. A response to a purchase request may include embedded or externally (URL) delivered content items. Content item download may be managed by the client in a variety of ways. Small downloads may not need specific handling and may be started and completed synchronously while an end user waits in a progress dialog. For large files, downloads may be problematic for a number of reasons and download management may be implemented. For example, large files may be subject to interruption due to incoming calls on a mobile device, poor signal reception, power supply inadequacy and the like. Thus, the download of large files may require management. Download management may be implemented in a variety of ways.

For example, according to an embodiment of the present invention, download may occur as a background operation. Also, for downloads that are interrupted, downloads may be continued or scheduled at a later time. Download management may include pre-allocation of storage to prevent download termination due to lack of download storage space.

According to another embodiment of the present invention, the downloading of content may depend on a variety of characteristics such as, for example, platform versions, available APIs, other installed content and the like. Thus, embodiments of the present invention may implement dependency checking before a user purchases content for download. For example, content may require that certain hardware or software platforms be available on the client device. If the required platforms are not available, the client may prevent an end user from accessing the content having the requirement. As another example, some content items may require that other components be available on the client device. According to an embodiment of the present invention, the client may check the content and the client for content dependencies and notify the end user if additional components are required for a selected content item.

Thus, according to embodiments of the present invention, end user content purchasing tasks may be combined into a single, consistent experience for the end user irrespective of content type, access points, payment methods and the like. Content discovery, delivery and payment may be integrated into a single user experience. Moreover, branding opportunities may be made available to the service operator/distributor/retailer.

Also, multiple OMA enablers may be combined into a single service offering to service operators. Rather than utilizing multiple separate and independent OMA enablers, a service operator may benefit from the service offered by the client application and client-server mechanism of embodiments of the present invention while still basing the available technology on separate, independent OMA enablers. Thus, end users may experience a single application that lists available content and permits end user preview and content purchase with a single, consistent end user experience.

While particular embodiments of the present invention have been shown and described, it will be obvious to those skilled in the art that the invention is not limited to the particular embodiments shown and described and that changes and modifications may be made without departing from the spirit and scope of the appended claims.

What is claimed is:

1. A method for selecting and receiving a content item from a server comprising:
    presenting a hierarchy of a plurality of content items from a plurality of content providers, the hierarchy of a plurality of content items having been organized on the server;
    facilitating a selection of a content item in the hierarchy of the plurality of content items;
    sending a request for a selected content item; and
    receiving the selected content item,
    wherein facilitating a selection comprises presenting a preview of a selected content item.

2. The method of claim 1, wherein facilitating a selection further comprises facilitating a purchase of the selected content item.

* * * * *